UNITED STATES PATENT OFFICE.

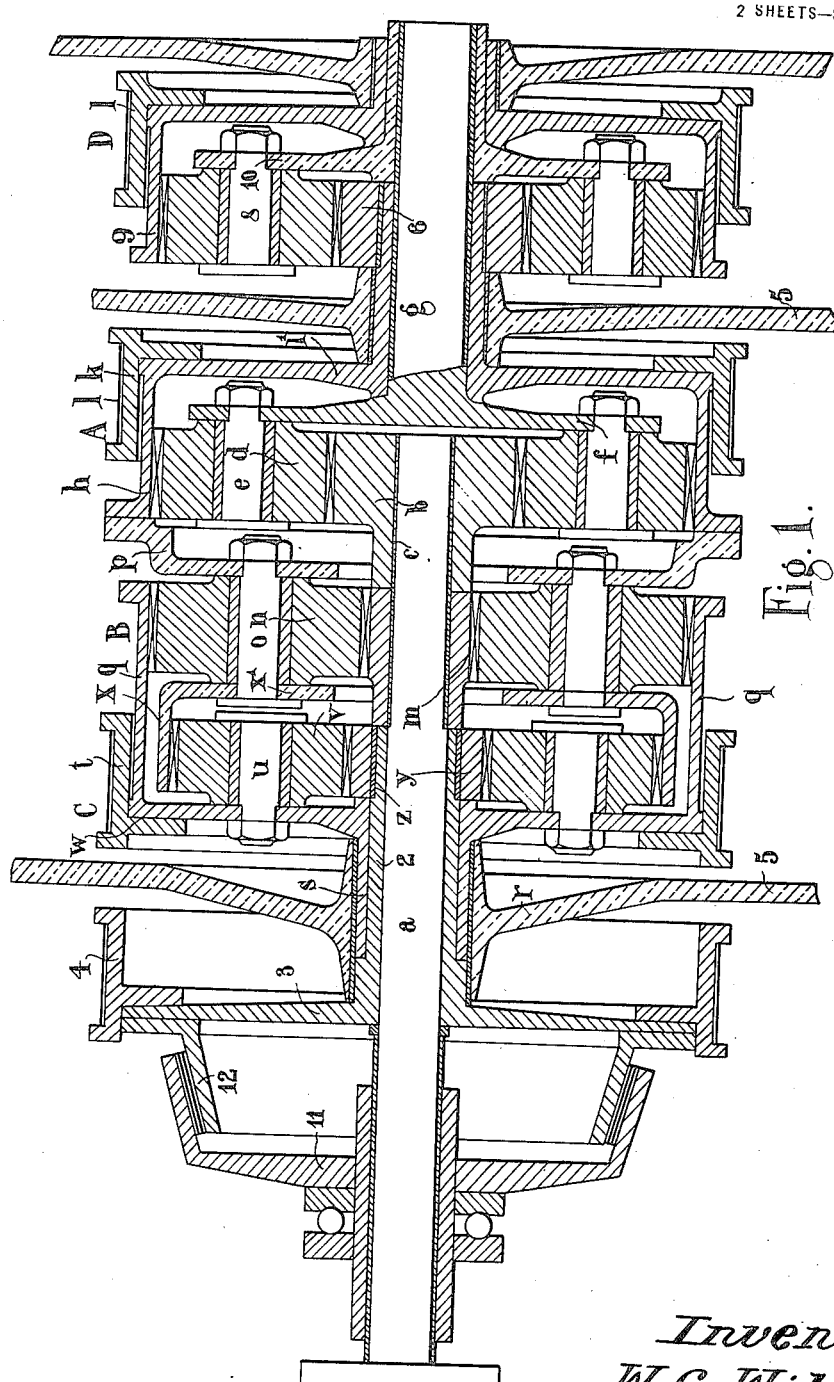

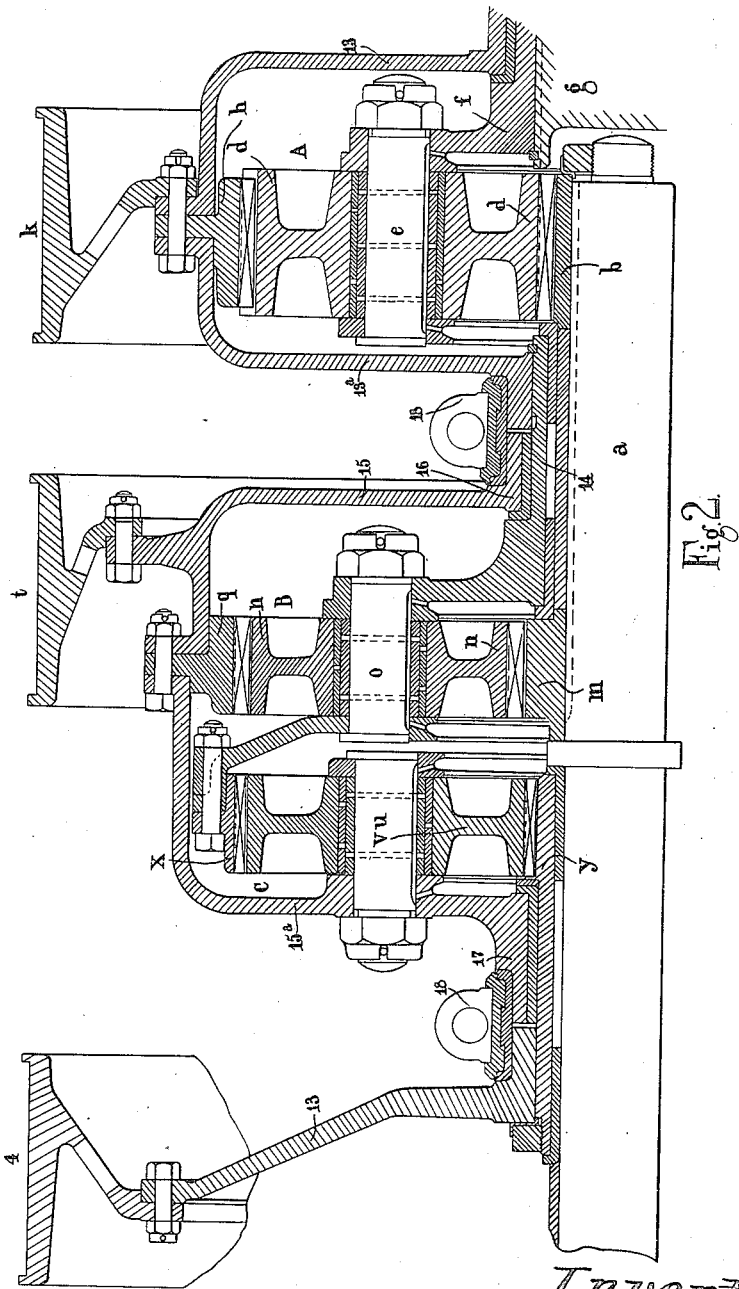

WALTER GORDON WILSON, OF CHARTON, FARNINGHAM, ENGLAND.

EPICYCLIC GEAR.

1,404,675.  Specification of Letters Patent.  Patented Jan. 24, 1922.

Application filed January 5, 1921. Serial No. 435,287.

(GRANTED UNDER THE PROVISIONS OF THE ACT OF MARCH 3, 1921, 41 STAT. L., 1313.)

*To all whom it may concern:*

Be it known that I, WALTER GORDON WILSON, a subject of the King of Great Britain and Ireland, and residing at Charton, Farningham, in the county of Kent, England, have invented a certain new and useful Improved Epicyclic Gear, (for which I have filed application in England No. 299,944, Dec. 1, 1919, Patent No. 164,042,) of which the following is a specification.

This invention relates to epicyclic gearing of the type in which three changes of speed in addition to a direct drive are obtained from three groups of gears, all three speeds being obtained from the planetary movement of the first group initiated by the driving sun pinion and the annulus thereof: the first speed being obtained by locking the annulus of the first group, the second speed, by locking the annulus of the second group and driving the annulus of the first group by the planetary motion of the second group, thus compounding the two groups, and the third speed, by compounding the second and third groups with the first.

In such arrangements as previously proposed the annulus of the third speed group has been braked in order to secure the desired third speed; but it is found that such a system causes an inconveniently high speed of the planet pinions of such group.

The object of this invention is to provide improved means for effecting the compounding of the three groups for obtaining the third speed, and which will obviate the above mentioned disadvantage.

This object is attained by so arranging the gears of the third group that the third speed is obtained by locking the sun pinion of such group.

Figure 1 illustrating a form of gear with a reverse and a direct drive; while

Figure 2 shows a stronger form of the gear without the direct drive and reverse.

In carrying the invention into effect with reference to Figure 1, the mechanism comprises three epicyclic groups denoted generally by A, B and C of sun and planet pinions arranged side by side along the central driving shaft $a$. The first speed group is A, the second is B and the third is C. The sun pinion $b$, splined at $c$ upon the end of the shaft $a$, has a pitch diameter suitable for the desired gearing ratio, while the corresponding planet wheels $d$ which it gears with are respectively carried on studs $e$ projecting from a disc $f$ carried by the driven shaft $g$ which transmits power to any mechanism it is desired to drive such as for example, a winch or similar mechanism or the Cardan shaft or axle of a motor vehicle. Such shaft $g$ is shown as being in alignment with the driving shaft $a$, but it may, if desired, extend through the latter shaft $a$. Surrounding the planet pinions $d$ and meshing therewith is an internally toothed annulus $h$ which externally at $k$ is adapted to receive a band brake $l$ by which it may be held stationary or released as the case may be.

For the second speed, the sun pinion $m$ splined on the power shaft $a$ and the corresponding planet pinions $n$ are of appropriate pitch diameter, and the pins or studs $o$ for the planet pinions $n$ are carried by an extension $p$ of the annulus $h$ of the first speed group. The planet pinions $n$ of the second group gear with a second internally toothed annulus $q$ supported by a disc $w$ fitted with a sleeve-like boss $s$ surrounding the central shaft which annulus $q$ is adapted externally at $t$ to serve as a second brake element.

The third speed comprises a third speed group in which the studs or pins $u$ of the planetary pinions $v$ are rigidly supported by the disc $w$ carrying the second annulus $q$. Surrounding the planet pinions of this group is a third internally toothed annulus $x$ carried by a disc $x'$ indirectly forming part of the first annulus $h$ through the extension $p$ and the second planetary pinions $n$. For controlling the operation of this third group, its sun pinion $y$ is splined at $z$ upon a sleeve 2 surrounding the power shaft $a$ and fitted with an external disc 3 which is adapted at 4 to serve as a third brake member. The frame members 5 form part of a general frame or casing supporting the gear as a whole.

The operation of the mechanism is as follows:—When the annulus $k$ of the first speed group A is braked, the motor driven sun pinion $b$, causes the planet pinions $d$ to turn on their own axes $e$ and also to make an orbital progression around the sun pinion which is given out to the transmission shaft $g$. The other two speed groups B, C at the same time run idle.

For the second speed, the first brake element $l$ is released and the second brake $t$ put into operation. The second speed planet pinions $n$ then perform an orbital movement and also carry round the first annulus $h$, the resulting differential in speed between the annulus $h$ and the sun pinion $b$ of the first speed group A giving a proportional orbital movement to the planet pinions of this second group B which gives a second speed to the power transmission shaft $g$. These two speed groups are thus compounded.

For the third speed, the second brake $t$ is released and the third sun pinion $y$ is locked by the operation of the brake 4. The sun pinion $y$ being stationary, then, whether the annulus $x$ or the planet disc $y$ be driven, there will always be the same relative speed between the two, such speed depending upon the pitch diameters of the gears of the set. The annulus $x$ and the planet disc $w$ are respectively connected to planet disc $x^1$ and the annulus $q$ of the second set of gears. These latter are driven by the sun pinion $m$ and the relative speed thereof being fixed, they will necessarily be driven at fixed speeds depending upon the speed of the sun gear $m$ and the pitch diameters of the gears of the set. The planet disc $x^1$ of the second set of gears being connected to the annulus $h$ of the first set of gears the said annulus will be driven at a certain definite speed and the differential of speed between this and the sun pinion $b$ will control the speed of the shaft $g$ in the same manner as in the second speed. The third speed is thus compounded of the three speed groups.

The above speed groups are so relatively arranged that each end is left free and in such condition as regards torque and speed that a direct drive element may be conveniently added at one end, and a reverse drive at the other end, should the use of either or both be necessary or requisite. Thus for obtaining a reverse drive, the annulus $h$ of the first speed which is arranged at one end is adapted by means of a disc $l'$ or the like to carry a central sun pinion 6 of a fourth epicyclic group D, and in order that the reverse shall be rendered operative, the annulus of such fourth group is locked by means of a brake band 7. The annulus $h$ of the first speed group A being released, the rotational movement it receives from the planets $d$ of that group drives the reversing sun pinion 6 in the necessary reverse direction whereby the corresponding planets 8 make an orbital progression in the same direction as the sun pinion and depending upon the reaction between the driving effort of the reversing sun pinion 6 and the locked annulus 9 of the reversing group. The planet pinions 8 are carried by a disc 10 which is splined to the speed transmission shaft $g$ so that the desired reverse in speed is imparted to the particular machine, winch or the like.

For the direct drive, the shaft at the other end of the gear, viz., adjacent the third speed groups C, is fitted with a ring or other suitable non-toothed clutch, one element 11 of which is carried on the shaft $a$, while the other 12 is attached to the disc 3 carrying the sun pinion $y$ of the third group C.

The braking elements above referred to, preferably consist of the usual steel band such as that shown in section at $l$, applied around a surface on the corresponding annulus by means of the usual small lever operated by a long lever mounted on an immovable fulcrum. This being the usual construction it is not illustrated.

In the above described modification, the annulus of each speed group overhangs on one side its respective planet pinions, as is usual for relatively light work such as a motor vehicle, but for heavy work, such an arrangement might constitute a weakness, and cause bending of the shaft.

To avoid this, the form of the annulus in each case is modified as shown in Figure 2, so that a double bearing on the centre shaft is secured. In the heavier construction of the gear shown in Figure 2, the same general epicyclic system is used, and similar parts are lettered the same. The annulus $h$ of the speed group A comprises a ring bolted to two-disc-like members 13 and 13$^a$ each having a bearing on the centre shafting. The bearing for 13 slides loose upon a sleeve extension of the member $f$ which supports the planet pinions $d$, while the bearing for 13$^a$ is splined to a sleeve extension 14 of the bearer for the second speed planet pinions $n$. The discs 13 and 13$^a$ are also combined with the brake member $k$.

The second speed annulus $q$, is also bolted to discs 15 and 15$^a$, the centre bearing 16 for the former sliding around the sleeve extension 14, while the latter 15$^a$ has a center bearing 17 sliding upon the sleeve which carries the sun pinion $y$ of the third group. The bearings 16 and 17 are firmly and rigidly held in place by bearing blocks and caps 18. In such a construction there will be less danger of bending the shaft when applying the various brakes, since the reaction is absorbed in the bearing blocks and caps. The third speed annulus $y$ may overhang as shown and this would not matter as it does not act as a brake element.

By the arrangement shown, the three speed groups are covered in and efficiently protected. Although the reverse and the direct drive are not illustrated in Figure 2, they may be combined therewith when necessary.

By the foregoing an epicyclic gear is obtained having three speeds and a direct drive with the gears compounded. The direct drive is applied with a low torque and the reverse drive may be added under proper conditions of speed and torque. Moreover, the gear is also protected against damage in the case of heavy work. Moreover it will be seen from the drawings that the relative sizes of the planet pinions are no smaller than requisite and that excessive angular velocities are avoided.

Having now described my invention, what I claim as new and desire to secure by Letters Patent is:—

1. In an epicyclic gear comprising a driving shaft, three groups of epicyclic gearing carried thereon, a driven shaft in operable connection with the first group of gears, means whereby one speed is obtained by locking the annulus of the first group of gears, and means whereby a second speed resulting from the compounding of the first and second groups is obtained by locking the annulus of the second group of gears, the combination of means whereby a third speed resulting from the compounding of the three groups is obtained by locking the sun pinion of the third group.

2. An epicyclic gear as claimed in claim 1, in which the first group of epicyclic gears comprises a sun pinion keyed to the driving shaft, a planet disc in driving connection with the driven shaft, planet pinions carried by such disc, and an annulus, the second group of gears comprises a sun pinion keyed to the driving shaft, a planet disc rigidly connected to the annulus of the first group of gears, planet pinions carried by such disc, and an annulus, and the third group of gears comprises a sun pinion loosely mounted on the driving shaft, a planet disc rigidly connected to the annulus of the second group of gears, planet pinions carried by such disc, and an annulus rigidly connected to the planet disc of the second group of gears.

3. An epicyclic gear as claimed in claim 1, in which the means for locking the sun pinion of the third group of gears for obtaining the third speed comprises a sleeve member upon which the said sun pinion is mounted, such sleeve member being freely mounted upon the driving shaft, a brake pulley mounted on the outer end of such sleeve member, and means for braking such brake pulley.

4. In an epicyclic gear as claimed in claim 2, the combination of means for obtaining a direct drive such means comprising a clutch member rigidly connected to the sun pinion of the third group of gears, a complemental clutch member on the driving shaft and means whereby such clutch members are caused to engage so as to lock the said pinion to the driving shaft.

5. In an epicyclic gear as claimed in claim 2, the combination of means for obtaining a reverse drive, such means comprising a planet disc rigidly mounted on the driven shaft, planet gears therefor, an annulus adapted to rotate freely on the driven shaft, a sun pinion rigidly connected to the annulus of the first group of gears, and means for locking the annulus mounted on the driven shaft.

6. In an epicyclic gear as claimed in claim 2, the combination of means for obtaining a direct drive and a reverse drive, the former means comprising a clutch member rigidly connected to the sun pinion of the third group of gears, a complemental clutch member on the driving shaft and means whereby such clutch members are caused to engage so as to lock the said pinion to the driving shaft, and the latter means comprising a planet disc rigidly mounted on the driven shaft, planet gears therefor, an annulus adapted to rotate freely on the driven shaft, a sun pinion rigidly connected to the annulus of the first group of gears, and means for locking the annulus mounted on the driven shaft.

7. An improved epicyclic gear comprising in combination a central driving shaft, three groups of sun and planet gearing thereon, an annulus exterior to and in engagement with the planetary gearing of each group, two pairs of discs for supporting respectively the annuli of the first and second groups of gears, an independent bearing co-axial with the centre shaft for each disc, a retarding member for each of such pairs of discs, a retarding member for the sun pinion of the third group, means for carrying the annulus of the remaining group of gears from the planet disc of one of the other groups of gears, and a driven shaft in operable connection with the first group of gears.

In testimony whereof I have signed my name to this specification.

WALTER GORDON WILSON.